US010550315B2

United States Patent
Waller et al.

(10) Patent No.: US 10,550,315 B2
(45) Date of Patent: Feb. 4, 2020

(54) COMPOSITIONS AND METHODS FOR DELAYED CROSSLINKING IN HYDRAULIC FRACTURING FLUIDS

(71) Applicant: Ecolab USA Inc., St. Paul, MN (US)

(72) Inventors: Christopher Waller, Houston, TX (US); Kirk E. Wells, Sugar Land, TX (US); Trinh Tran, Manvel, TX (US); Pablo Munoz, Katy, TX (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/649,129

(22) Filed: Jul. 13, 2017

(65) Prior Publication Data

US 2018/0016488 A1    Jan. 18, 2018

Related U.S. Application Data

(60) Provisional application No. 62/362,691, filed on Jul. 15, 2016.

(51) Int. Cl.
   *C09K 8/90*    (2006.01)
   *C09K 8/68*    (2006.01)
   (Continued)

(52) U.S. Cl.
   CPC .............. *C09K 8/685* (2013.01); *C09K 8/528* (2013.01); *C09K 8/602* (2013.01); *C09K 8/605* (2013.01);
   (Continued)

(58) Field of Classification Search
   CPC ........................ C09K 2208/12; C09K 2208/26; C09K 8/528; C09K 8/602; C09K 8/605;
   (Continued)

(56) References Cited

U.S. PATENT DOCUMENTS 3,058,909 A    10/1962    Kern
3,301,723 A     1/1967    Chrisp
(Continued)

FOREIGN PATENT DOCUMENTS

AU    704257 B2    3/1996
AU    3053295 A    3/1996
(Continued)

OTHER PUBLICATIONS

International Search Report for International Application No. PCT/US2017/041943, dated Oct. 11, 2017 (5 pages).
Written Opinion for International Application No. PCT/US2017/041943, dated Oct. 11, 2017 (10 pages).
BASF Corporation, The Chemical Company, Technical Bulletin, Quadrol® Polyol, 2004, 1 page.
(Continued)

*Primary Examiner* — Alicia Bland
(74) *Attorney, Agent, or Firm* — Kagan Binder, PLLC (57) ABSTRACT

Disclosed herein are compositions and methods for delaying crosslinking of aqueous crosslinkable polymers such as polysaccharides in injectable compositions for hydraulic fracturing and related applications. The compositions and methods provide delayed crosslinking at high temperatures and pressures, such as those encountered by hydraulic fracturing compositions injected into subterranean environments. Compositions include injectable solutions comprising a competing agent that is a reaction product of a dialdehyde having 2 to 4 carbon atoms with a non-polymeric cis-hydroxyl compound. Provided are methods of making and using delayed-crosslinking compositions comprising crosslinker compositions containing zirconium complexes and the competing agents.

12 Claims, 2 Drawing Sheets

(51) Int. Cl.
 *C09K 8/60* (2006.01)
 *C09K 8/528* (2006.01)
 *E21B 33/138* (2006.01)
 *E21B 37/06* (2006.01)

(52) U.S. Cl.
 CPC .............. *C09K 8/90* (2013.01); *E21B 33/138* (2013.01); *E21B 37/06* (2013.01); *C09K 2208/12* (2013.01); *C09K 2208/26* (2013.01)

(58) Field of Classification Search
 CPC .......... C09K 8/685; C09K 8/887; C09K 8/90; E21B 33/138; E21B 37/06
 See application file for complete search history.

(56) References Cited

U.S. PATENT DOCUMENTS

| | | | |
|---|---|---|---|
| 4,477,360 A | 10/1984 | Almond | |
| 4,534,870 A | 8/1985 | Williams | |
| 4,537,634 A | 8/1985 | Floyd | |
| 4,553,601 A | 11/1985 | Almond et al. | |
| 4,578,488 A | 3/1986 | Rummo et al. | |
| 4,619,776 A | 10/1986 | Mondshine | |
| 4,683,068 A | 7/1987 | Kucera | |
| 4,686,052 A | 8/1987 | Baranet et al. | |
| 4,702,848 A | 10/1987 | Payne | |
| 4,798,902 A | 1/1989 | Putzig | |
| 5,082,579 A | 1/1992 | Dawson | |
| 5,145,590 A | 9/1992 | Dawson | |
| 5,160,643 A * | 11/1992 | Dawson .............. | C08B 37/0087 166/308.5 |
| 5,165,479 A | 11/1992 | Harris et al. | |
| 5,217,632 A | 6/1993 | Sharif | |
| 5,226,481 A | 7/1993 | Le et al. | |
| 5,305,832 A | 4/1994 | Gupta et al. | |
| 5,335,733 A | 8/1994 | Sandiford et al. | |
| 5,488,083 A | 1/1996 | Kinsey, III et al. | |
| 5,559,082 A | 9/1996 | Sanner et al. | |
| 5,565,513 A | 10/1996 | Kinsey, III et al. | |
| 5,658,861 A | 8/1997 | Nelson et al. | |
| 5,773,638 A | 6/1998 | Dawson et al. | |
| 5,789,350 A | 8/1998 | Moradi-Araghi et al. | |
| 5,877,127 A | 3/1999 | Card et al. | |
| 5,950,729 A | 9/1999 | Dawson et al. | |
| 5,972,850 A | 10/1999 | Nimerick | |
| 6,060,436 A | 5/2000 | Snyder et al. | |
| 6,138,760 A | 10/2000 | Lopez et al. | |
| 6,177,385 B1 | 1/2001 | Nimerick | |
| 6,302,209 B1 | 10/2001 | Thompson, Sr. et al. | |
| 6,310,008 B1 | 10/2001 | Rietjens | |
| 6,316,506 B2 | 11/2001 | Asgharian | |
| 6,403,609 B1 | 6/2002 | Asgharian | |
| 6,486,215 B2 | 11/2002 | Asgharian | |
| 6,495,608 B1 | 12/2002 | Asgharian | |
| 6,583,124 B2 | 6/2003 | Asgharian | |
| 6,617,285 B2 | 9/2003 | Crews | |
| 6,719,053 B2 | 4/2004 | Thompson | |
| 6,838,449 B2 | 1/2005 | Asgharian | |
| 6,849,581 B1 | 2/2005 | Thompson et al. | |
| 7,084,093 B2 | 8/2006 | Crews | |
| 7,084,096 B2 | 8/2006 | Harris, Jr. et al. | |
| 7,160,842 B2 | 1/2007 | Crews | |
| 7,169,767 B2 | 1/2007 | Asgharian | |
| 7,268,100 B2 | 9/2007 | Kippie et al. | |
| 7,396,924 B2 | 7/2008 | Rinaldi et al. | |
| 7,565,933 B2 | 7/2009 | Kippie et al. | |
| 7,566,686 B2 | 7/2009 | Kippie et al. | |
| 7,595,391 B2 | 9/2009 | Norman et al. | |
| 7,712,535 B2 | 5/2010 | Venditto et al. | |
| 7,732,382 B2 | 6/2010 | Putzig | |
| 7,732,383 B2 | 6/2010 | Putzig | |
| 7,754,660 B2 | 6/2010 | Putzig | |
| 7,795,187 B2 | 9/2010 | Putzig | |
| 7,795,188 B2 | 9/2010 | Putzig | |
| 7,795,190 B2 | 9/2010 | Putzig | |
| 7,851,417 B2 | 12/2010 | Putzig | |
| 7,886,824 B2 | 2/2011 | Kakadjian et al. | |
| 7,921,046 B2 | 4/2011 | Parsons et al. | |
| 7,932,214 B2 | 4/2011 | Zamora et al. | |
| 7,942,201 B2 | 5/2011 | Ekstrand et al. | |
| 7,956,217 B2 | 6/2011 | Falana et al. | |
| 7,968,501 B2 | 6/2011 | Parris | |
| 7,972,998 B2 | 7/2011 | Dessinges et al. | |
| 7,989,404 B2 | 8/2011 | Kakadjian et al. | |
| 7,992,653 B2 | 8/2011 | Zamora et al. | |
| 8,003,578 B2 | 8/2011 | Monroe et al. | |
| 8,011,431 B2 | 9/2011 | van Petegem et al. | |
| 8,030,250 B2 | 10/2011 | Sun et al. | |
| 8,034,750 B2 | 10/2011 | Thompson et al. | |
| 8,053,468 B2 | 11/2011 | Selifonov | |
| 8,065,905 B2 | 11/2011 | Sweeney et al. | |
| 8,084,401 B2 | 12/2011 | Lukocs et al. | |
| 8,093,431 B2 | 1/2012 | Falana et al. | |
| 8,141,661 B2 | 3/2012 | Kakadjian et al. | |
| 8,158,562 B2 | 4/2012 | Wilson, Jr. et al. | |
| 8,172,952 B2 | 5/2012 | Wanner et al. | |
| 8,173,580 B2 | 5/2012 | De Benedictis et al. | |
| 8,273,693 B2 | 9/2012 | Schwartz | |
| 8,287,640 B2 | 10/2012 | Zamora et al. | |
| 8,362,298 B2 | 1/2013 | Falana et al. | |
| 8,371,383 B2 | 2/2013 | Bell et al. | |
| 8,450,252 B2 | 5/2013 | Funkhouser et al. | |
| 8,466,094 B2 | 6/2013 | Kakadjian et al. | |
| 8,505,362 B2 | 8/2013 | Sweeney et al. | |
| 8,507,412 B2 | 8/2013 | Lukocs et al. | |
| 8,507,413 B2 | 8/2013 | Wilson, Jr. | |
| 8,524,639 B2 | 9/2013 | Falana et al. | |
| 8,539,821 B2 | 9/2013 | Sweeney et al. | |
| 8,546,519 B2 | 10/2013 | Selifonov et al. | |
| 8,596,911 B2 | 12/2013 | Curr et al. | |
| 8,636,066 B2 | 1/2014 | Gupta et al. | |
| 8,673,826 B2 | 3/2014 | Dessinges et al. | |
| 8,728,989 B2 | 5/2014 | Kakadjian, Sr. et al. | |
| 8,746,044 B2 | 6/2014 | Curr et al. | |
| 8,835,364 B2 | 9/2014 | Thompson et al. | |
| 8,841,240 B2 | 9/2014 | Kakadjian et al. | |
| 8,846,585 B2 | 9/2014 | Falana et al. | |
| 8,851,174 B2 | 10/2014 | Zamora et al. | |
| 8,871,694 B2 | 10/2014 | Kakadjian et al. | |
| 8,895,480 B2 | 11/2014 | Dawson et al. | |
| 8,899,328 B2 | 12/2014 | Zamora et al. | |
| 8,921,597 B2 | 12/2014 | Sun et al. | |
| 8,932,996 B2 | 1/2015 | Falana et al. | |
| 9,062,242 B2 | 6/2015 | Jiang et al. | |
| 9,181,469 B2 | 11/2015 | Dobson, Jr. et al. | |
| 2007/0187101 A1 | 8/2007 | Putzig | |
| 2007/0187642 A1* | 8/2007 | Putzig .................. | C09K 8/512 252/182.13 |
| 2008/0149333 A1 | 6/2008 | Putzig | |
| 2008/0227667 A1 | 9/2008 | Szymanski et al. | |
| 2008/0236824 A1 | 10/2008 | Putzig | |
| 2008/0242563 A1* | 10/2008 | Putzig .................. | C09K 8/512 507/211 |
| 2009/0149354 A1 | 6/2009 | Dajani et al. | |
| 2011/0030962 A1 | 2/2011 | Parris | |
| 2012/0152544 A1 | 6/2012 | Parris et al. | |
| 2012/0157560 A1 | 6/2012 | Selifonov et al. | |
| 2014/0209304 A1 | 7/2014 | Reed et al. | |
| 2015/0094239 A1* | 4/2015 | Harry .................... | C09K 8/685 507/217 |

FOREIGN PATENT DOCUMENTS

| | | |
|---|---|---|
| CN | 101993688 A | 3/2011 |
| CN | 102634329 A | 8/2012 |
| CN | 104559995 A1 | 4/2015 |
| EP | 0528461 A2 | 2/1993 |
| EP | 0528461 B1 | 2/1993 |
| EP | 0528461 B2 | 2/1993 |
| EP | 0805260 A2 | 11/1997 |
| EP | 0805260 B1 | 11/1997 |
| EP | 0970175 B1 | 1/2000 |

(56) References Cited

FOREIGN PATENT DOCUMENTS

| | | | |
|---|---|---|---|
| EP | 0999825 | B1 | 5/2000 |
| EP | 0999854 | B1 | 5/2000 |
| EP | 1092835 | A1 | 4/2001 |
| EP | 1203808 | A1 | 5/2002 |
| EP | 1203808 | B1 | 5/2002 |
| EP | 1348427 | A1 | 10/2003 |
| EP | 1490408 | B1 | 12/2004 |
| GB | 2254636 | A | 10/1992 |
| GB | 2291907 | A | 2/1996 |
| GB | 2383597 | A | 7/2003 |
| GB | 2383597 | B | 7/2003 |
| WO | 99/06023 | A1 | 2/1999 |
| WO | 99/06070 | A1 | 2/1999 |
| WO | 99/06512 | A1 | 2/1999 |
| WO | 03/001030 | A1 | 1/2003 |
| WO | 03/078473 | A1 | 9/2003 |
| WO | 2006/095291 | A1 | 9/2006 |

OTHER PUBLICATIONS

Dorf Ketal Specialty Catalysts, LLC, Organic Zirconate, TYZOR® NPZ, 2011, 2 pages.
Guar and Guarivatives Oil and Gas Field, Aqualon, 2007, 44 pages.
Sigma-Aldrich, 515833—Tetrakis (triethanolaminato) zirconium (IV) retrieved from http://www.sigmaaldrich.com/catalog/product/aldrich/515833?lang=en&region=US, on Apr. 15, 2016, 3 pages.
Pesetsky et al., "Reaction of Glyoxal With Boric Acid and Borate Ion", Tetrahedron, vol. 25, Issue 18, p. 4137, 1969.
Doudoroff, et al., "Arsenolysis and Phosphorolysis of the Amy-lose and Amylopectin Fractions of Starch," Nature, vol. 161, p. 96, (1948).
Mendham et al., Vogel's Textbook of Quantitative Chemical Analysis, Sixth Edition, 14 pages, (2000).
H. Deuel et al, "Reaction of boric acid with polysaccharides", Nature, vol. 161, Issue 4081, Jan. 17, 1948, pp. 96-97.

* cited by examiner

COMPOSITIONS AND METHODS FOR DELAYED CROSSLINKING IN HYDRAULIC FRACTURING FLUIDS

TECHNICAL FIELD

The present invention relates to compositions and methods for delaying crosslinking of polymers effected by a variety of complexes in water.

BACKGROUND

Hydraulic fracturing is a well-stimulation technique in which subterranean rock is fractured by a hydraulically pressurized fracturing fluid typically made by combining water or an aqueous liquid, a hydraulic fracturing proppant (conventionally sand or aluminum oxide), and additive chemicals that modify subterranean flow, subterranean interfacial tension, and/or provide other effects. A hydraulic fracture is formed by pumping the fracturing fluid into a wellbore at a rate sufficient to increase pressure at the target depth to exceed that of the fracture gradient (pressure gradient) of the rock. When the hydraulic pressure is removed from the well, the hydraulic fracturing proppants lodge within the cracks to hold the fractures open. Hydrocarbon compounds such as natural gas and petroleum are recovered via the cracks in the hydrocarbon-containing deep-rock formations. Hydraulic fracturing techniques can be used to form a new well and can also be used to extend the life of an existing conventional oil well.

In recent years the hydraulic fracturing industry has turned to recycling the water that flows back from the subterranean formations after release of hydraulic pressure thereto. Such water is referred to as "produced water." Produced water is often characterized as having high total dissolved solids, such as at least about 1 wt % total dissolved solids and as much as about 35 wt % total dissolved solids, in addition to any residual fracturing fluid chemicals flowing back from the injection thereof. Stated differently, the dissolved solids in produced water are derived principally from the subterranean reservoir itself. In most cases, a substantial portion of the dissolved solids are ionic (one or more salts). Rather than treat the produced water to remove dissolved solids, it is economically more practical to simply use the produced water with no further treatment prior to use as a fracturing liquid.

Chemical additives including surfactants and polymers have been added to fracturing fluids in hydraulic fracturing processes to increase recovery of hydrocarbon compounds from subterranean hydrocarbon-containing formations by controlling interfacial energy of the fluid with the subterranean features such as various rock types, to control friction caused by the fracturing fluid as it flows within the subterranean formation and through narrow tubulars, to control viscosity of the fracturing fluid, or two or more thereof.

In order to carry the proppant particles used to keep the cracks in the subsurface formation open once they are fractured, the fracturing fluid needs to be able to carry these particles all the way down and into these cracks. One way of doing this is to increase the viscosity of the fracturing fluid. Crosslinking provides one means by which the viscosity of fracturing fluids can be increased.

A problem encountered during hydraulic fracturing is the loss of fluid injectivity in areas of relatively low permeability due to preferential flow of the fracturing fluid into higher permeability areas, sometimes known as "channeling". Oil bearing strata are usually heterogeneous, some parts of them being more permeable than others. As a consequence, channeling can occur so that the driving fluid flows preferentially through permeable zone depleted of oil (so-called "thief zones") rather than through those parts of the strata that contain sufficient oil to make oil recovery operations profitable. Difficulties in oil recovery due to high permeability of zones may be corrected by injecting an aqueous solution of an organic polymer and a crosslinking agent into certain subterranean formations where the polymer will be crosslinked to produce a gel, thus reducing the permeability of such subterranean formations to driving fluid (gas, water, etc.).

Crosslinked fluids or gels are now being used in wells under a variety of temperature and pH conditions. Polysaccharide or partially hydrolyzed polyacrylamide-based fluids crosslinked with certain aluminum, titanium, zirconium, and boron-based compounds are used in enhanced oil recovery operations. Such fracturing fluids can encounter a variety of conditions of high temperature and pressure in subterranean formations.

A disadvantage with many of the known crosslinkers is that they can cause an immediate and excessive increase in viscosity of the fracturing fluids to which they are added. Excessive viscosity increase before the fracturing fluid has sufficiently penetrated the subterranean formation increases strain on pumping equipment and/or requires greater energy consumption to pump the fracturing fluids into the subterranean formations. Excessive fracturing fluid viscosity can also increase shear in the pumping equipment, causing degradation of components within the fracturing fluid and leading to degradation in fracturing fluid performance.

A further issue encountered is that produced waters can contain dissolved reactive species such as boric acid and/or borate oxyanions, which can function as crosslinkers for polysaccharides and cause premature crosslinking of hydraulic fracturing fluids comprising polysaccharides and produced waters.

It would be advantageous to provide hydraulic fracturing compositions and methods for use in a variety of different subterranean conditions, which would allow for penetration of low-permeability zones in addition to or instead of thief zones by proppant bearing fluid. It would be further advantageous if such fluids could be used at the high temperatures and pressures found in deep subterranean locations.

SUMMARY

In embodiments, there is provided an injectable solution comprising a crosslinkable polymer, a competing agent comprising the reaction product of a dialdehyde having 2 to 4 carbon atoms with a non-polymeric cis-hydroxyl compound, a crosslinker composition, and at least one water source. In embodiments, the crosslinkable polymer is a polysaccharide. In some embodiments, the crosslinkable polymer is carboxymethyl hydroxypropyl guar. In embodiments, the competing agent is the reaction product of glyoxal and sorbitol. In embodiments, the crosslinker composition is the reaction product of zirconium (IV) tetra(n-propoxide) and triethanolamine in n-propanol. In some such embodiments, the crosslinker composition is the reaction product of zirconium (IV) tetra(n-propoxide) and triethanolamine in a 1:9 molar ratio. In embodiments, the water source comprises, consists of, or consists essentially of produced water.

In embodiments, there is provided a method of making a delayed-crosslinking composition, the method comprising combining a dialdehyde having 2 to 4 carbon atoms with a non-polymeric cis-hydroxyl compound in an aqueous solution to form a competing agent solution comprising a competing agent, adjusting the pH of the competing agent solution to maintain a pH of about 6.0 to about 6.5, combining a zirconium (IV) compound and an alkanolamine in one or more solvents to form a crosslinker composition comprising a zirconium complex, maintaining the crosslinker composition at a temperature of from about 35° C. to about 40° C. for 90 to 150 minutes, and combining the competing agent solution and the crosslinker composition to form a delayed-crosslinking composition. In embodiments, the dialdehyde comprises, consists of, or consists essentially of glyoxal. In embodiments, the cis-hydroxyl compound is sorbitol. In embodiments, the zirconium (IV) compound comprises, consists of, or consists essentially of zirconium (IV) tetra(n-propoxide). In embodiments, the alkanolamine comprises, consists of, or consists essentially of triethanolamine. In embodiments, the one or more solvents comprises, consists of, or consists essentially of n-propanol.

In embodiments, the method further comprises combining the delayed-crosslinking composition with a water source and a crosslinkable polymer to form an injectable solution, injecting the injectable solution into a subterranean reservoir, and recovering a hydrocarbon from the reservoir. In embodiments, the water source comprises, consists of, or consists essentially of produced water.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Although the present disclosure provides references to preferred embodiments, persons skilled in the art will recognize that changes may be made in form and detail without departing from the spirit and scope of the invention. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control.

As used herein, the term "produced water" means connate (native water within a reservoir prior to flowback) or flowback water (water that flows from a subterranean reservoir after one or more hydraulic fracturing or other well formation operations). In some embodiments, the produced water contains about 10 ppm to 500 ppm dissolved reactive boron species. In some embodiments, the connate or flowback further contains 500 ppm total dissolved solids to 1000 ppm total dissolved solids, in some embodiments, 1000 ppm to 10,000 ppm, in some embodiments 10,000-50,000 ppm, or in some embodiments 50,000 ppm to 100,000 ppm, in embodiments 100,000-500,000 ppm total dissolved solids.

As used herein, the term "reactive species" means a compound capable of participating in crosslinking reactions with compounds having one or more cis-hydroxyl moieties, unfunctionalized polysaccharides such as guar gum, and/or functionalized polysaccharides such as carboxymethyl hydroxypropyl guar.

As used herein, the term "reactive boron species" means boric acid, tetrahydroxyborate, or another boron-containing compound capable of forming orthoborate ($B(OH)_4^-$) or another boron-containing oxyanion structure at pH of greater than about 6.5 and/or capable of participating in crosslinking reactions with compounds having one or more cis-hydroxyl moieties, unfunctionalized polysaccharides such as guar gum, and/or functionalized polysaccharides such as carboxymethyl hydroxypropyl guar.

As used herein, the term "source of dissolved reactive boron species" means a source of a compound that is a reactive boron species, or is capable of forming one by chemical transformation or slow dissolution.

As used herein, "complex" means inter alia not only a moiety comprising a metal atom or a metal ion bonded to and/or associated with one or more ligands but also a metalloid atom or ion bonded to and associated with one or more ligands. Ligands can be monodentate, bidentate, and/or polydentate. In this context, ligands can be atoms, ions, molecules, other chemical structures, or combinations thereof. In this context, non-limiting examples of metalloids include boron, silicon, germanium, and antimony. Herein, the term "complex" includes any molecule or ion with a central atom, atoms, ion, or ions having ligands bonded thereto or associated therewith, the complex being capable of crosslinking the crosslinkable polymer. Thus "complex" includes borate oxyanions in addition to more conventional metal complexes with various ligands, and the term includes metal and metalloid oxides, hydroxides, and hydrated oxides with the proviso that they are capable of crosslinking the polymer having cis-functionality.

As used herein, "crosslinker composition" means a composition comprising a crosslinker, wherein the crosslinker is capable of crosslinking a crosslinkable polymer.

As used herein, the term "polymer solution" denotes a polymer either dispersed or dissolved in one or more solvents.

As used herein, the term "cis-hydroxyl" denotes a compound having at least one pair of hydroxyl groups situated in a 1,2 configuration, further wherein the hydroxyls are configured to allow the coordination thereof with a boron oxyanion or a metal complex center.

As used herein, the terms "comprise(s)," "include(s)," "having," "has," "can," "contain(s)," and variants thereof are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" or "about 1 to about 5", the recitation means "1 to 5" and "about 1 to about 5" and "1 to about 5" and "about 1 to 5" unless specifically limited by context.

As used herein, the term "consisting essentially of" means that the methods and compositions may include additional steps, components, ingredients or the like, but only if the additional steps, components and/or ingredients do not materially alter the basic and novel characteristics of the claimed methods and compositions.

Discussion

Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

First Embodiments

In first embodiments of the invention, there is provided an injectable solution comprising a crosslinkable polymer, a competing agent comprising the reaction product of a dialdehyde having 2 to 4 carbon atoms with a non-polymeric cis-hydroxyl compound, and at least one water source. In embodiments, the at least one water source comprises, consists of, or consists essentially of a produced water. In some such first embodiments, the injectable solution further comprises a crosslinker composition comprising, consisting of, or consisting essentially of one or more crosslinkers.

In embodiments, the one or more crosslinkers comprises, consists of, or consists essentially of a complex. In some embodiments, the at least one water source comprises one or more reactive species that acts as a crosslinker for the crosslinkable polymer. In other embodiments, the at least one water source does not comprise one or more reactive species that acts as a crosslinker for the crosslinkable polymer.

In some of the first embodiments, the injectable solution is made by combining at least one water source, a crosslinkable polymer, the competing agent, and the crosslinker composition comprising one or more crosslinkers. The at least one water source is selected from produced water, tap water, ground water, surface water, seawater, wastewater, deionized water, distilled water, or any combination thereof. In embodiments, the at least one water source comprises, consists of, or consists essentially of produced water. The terms produced water, tap water, ground water, surface water, seawater, wastewater, deionized water, and distilled water herein are construed to include such water sources having undergone further processing such as adulteration; or purification steps such as, but not limited to, filtration, activated carbon treatment, lime softening, sedimentation, and the like.

In some of the first embodiments, the injectable solution of the first embodiments is made by combining the at least one water source; the crosslinkable polymer; a competing agent solution comprising, consisting of, or consisting essentially of the competing agent and one or more competing agent solvents, and the crosslinker composition comprising one or more crosslinkers. In some such embodiments, the one or more competing agent solvents comprises, consists of, or consists essentially of a water source selected from produced water, tap water, ground water, surface water, seawater, wastewater, deionized water, distilled water, or any combination thereof.

In embodiments, the injectable solution of the first embodiments is made by combining an aqueous solution of the crosslinkable polymer, the competing agent solution, and the crosslinker composition. In some such embodiments, the aqueous solution of the crosslinkable polymer comprises, consists of, or consists essentially of the crosslinkable polymer and a produced water, tap water, ground water, surface water, seawater, wastewater, deionized water, distilled water, or any combination thereof.

In embodiments, the injectable solution of the first embodiments is made by combining the at least one water source, the aqueous solution of the crosslinkable polymer, the competing agent solution, and the crosslinker composition.

In embodiments, the injectable solution of the first embodiments is made by combining the at least one water source, the crosslinkable polymer, and a delayed-crosslinking composition, wherein the delayed-crosslinking composition comprises, consists of, or consists essentially of the competing agent solution and the crosslinker composition. In embodiments, the crosslinker composition comprises a zirconium (IV) complex.

In embodiments, the injectable solution of the first embodiments is made by combining the aqueous solution of the crosslinkable polymer and the delayed-crosslinking composition.

In embodiments, the injectable solution of the first embodiments is made by combining the at least one water source, the aqueous solution of the crosslinkable polymer, and the delayed-crosslinking composition.

The crosslinker composition of the first embodiments comprises, consists of, or consists essentially of one or more crosslinkers. The one or more crosslinkers are capable of crosslinking the crosslinkable polymer. In embodiments, one or more of the one or more crosslinkers is a complex. In embodiments, the one or more crosslinkers comprises an aluminum, antimony, boron, chromium, copper, iron, lead, manganese, niobium, titanium, zinc, or zirconium complex, wherein the complex has a central atom or ion selected from aluminum, antimony, boron, chromium, copper, iron, lead, manganese, niobium, titanium, zinc, or zirconium respectively, and has a coordination number of between two and six. In embodiments, the complex is a reactive boron species. In embodiments, the crosslinker composition comprises, consists of, or consists essentially of a complex of a metal and one or more ligands selected from alkanolamine, lactate, citrate, maleate, citraconate, tartrate, bitartrate, primary organic amine, secondary organic amine, tertiary organic amine, or acac (acetylacetonate). In some such embodiments, the alkanolamine comprises, consists of, or consists essentially of triethanolamine. In embodiments, the crosslinker composition comprises a zirconium complex. In embodiments, the zirconium complex comprises, consists of, or consists essentially of a zirconium (IV) complex that is the reaction product of tetra(n-propoxy) zirconium with an alkanolamine. In some such embodiments, the zirconium complex is a zirconium (IV) complex that is the reaction product of tetra(n-propoxy) zirconium with triethanolamine.

In embodiments, the molar ratio of the zirconium complex to the competing agent in the crosslinker composition is about 5:1 to 1:20, in embodiments 5:1 to 1:10, in embodiments 5:1 to 1:5, in embodiments 5:1 to 1:1, in embodiments, 5:1 to 2:1, in embodiments 5:1 to 3:1, in embodiments about 4:1, in embodiments 3.9:1. In some such embodiments, the molar ratio is the molar ratio of sorbitol equivalent to zirconium in the injectable solution. The sorbitol equivalent is the amount of the reaction product of sorbitol and the dialdehyde plus the amount of any unreacted sorbitol.

In embodiments, the crosslinker composition is a product obtained by combining a zirconium (IV) alkoxide and an alkanolamine. In embodiments, the crosslinker composition is a product obtained by combining a zirconium tetraalkoxide and an alkanolamine. In embodiments, the alkanolamine comprises, consists of, or consists essentially of triethanolamine. In embodiments, the crosslinker is the product of combining a zirconium tetraalkoxide solution in a first alcoholic solvent with an alkanolamine. In embodiments, the alkanolamine is not dissolved or dispersed in a solvent. In embodiments, the alkanolamine is dissolved and/or dispersed in a second alcoholic solvent. In embodiments, the first and second alcoholic solvents are the same. In embodiments, the first and second alcoholic solvents are different. In embodiments, each of the first and second alcoholic solvents comprises, consists of, or consists essentially of a C1 to C7 alcohol. In embodiments, the crosslinker composition is the product of combining triethanolamine with a zirconium tetraalkoxide solution in a C1 to C7 alcohol. In embodiments, the crosslinker composition is the product of combining triethanolamine with a zirconium tetra(n-propoxide) solution in n-propanol. In embodiments, the crosslinker composition is the product of combining triethanolamine and a zirconium tetra(isopropoxide) solution in a first alcoholic solvent comprising, consisting of, or consisting essentially of isopropanol. In embodiments, the crosslinker composition is the product of combining triethanolamine and a zirconium tetra(n-butoxide) solution in a first alcoholic solvent comprising, consisting of, or consisting essentially of n-butanol. In embodiments, the crosslinker composition is the product of combining triethanolamine and a zirconium tetra(t-butoxide) solution in a first alcoholic solvent comprising, consisting of, or consisting essentially of t-butanol. In embodiments, the crosslinker composition is the product of combining triethanolamine and a zirconium tetra(i-butoxide) solution in a first alcoholic solvent comprising, consisting of, or consisting essentially of i-butanol. In embodiments, the crosslinker composition is the product of combining triethanolamine and a zirconium tetraethoxide solution in a first alcoholic solvent comprising, consisting of, or consisting essentially of ethanol. In embodiments, the molar ratio of the zirconium tetraalkoxide to alkanolamine is from about 1:5 to about 1:11, in embodiments about 1:6 to 1:11, in embodiments about 1:7 to about 1:10, in embodiments about 1:8 to 1:10, in embodiments about 1:9. In some such embodiments, the alkanolamine comprises, consists of, or consists essentially of triethanolamine.

Applicants have found that crosslinker compositions that are the product of combining zirconium tetra(alkoxide) and triethanolamine in a molar ratio of 1:8 to 1:10 respectively are especially useful for combination with a competing agent comprising the reaction product of a dialdehyde having 2 to 4 carbon atoms with a non-polymeric cis-hydroxyl compound to provide a delayed-crosslinking composition for addition to a polysaccharide such as carboxymethyl hydroxypropyl guar to provide injectable solutions for high downhole temperature applications such as up to 200° C. In such applications, Applicants have found that the competing agent that is the product of the reaction of glyoxal and sorbitol is useful.

Second Embodiments

In the second embodiments of the invention, there is provided an injectable solution comprising a crosslinkable polymer, a competing agent comprising the reaction product of a dialdehyde having 2 to 4 carbon atoms with a non-polymeric cis-hydroxyl compound, and at least one water source comprising one or more reactive species. In embodiments, the at least one water source comprises, consists of, or consists essentially of produced water. In the second embodiments of the invention, no additional crosslinker is added to the injectable solution, but the crosslinker is supplied by the water source as one or more reactive species. The crosslinker consists of or consists essentially of one or more dissolved reactive species present as a native species in the at least one water source. In embodiments, the at least one water source comprises, consists of, or consists essentially of produced water comprising the one or more dissolved reactive species present as a native species in the produced water. In embodiments, the native species in the produced water comprises, consists of, or consists essentially of a reactive boron species. In embodiments, the injectable solution is made by combining the at least one water source comprising one or more reactive species, the crosslinkable polymer, and the competing agent. In embodiments, the at least one water source is selected from produced water, tap water, ground water, surface water, seawater, wastewater, deionized water, distilled water, or any combination thereof, with the proviso that the at least one water source comprises one or more reactive species. The terms produced water, tap water, ground water, surface water, seawater, wastewater, deionized water, and distilled water herein are construed to include such water sources having undergone further processing such as adulteration; or purification steps such as, but not limited to, filtration, activated carbon treatment, lime softening, sedimentation, and the like.

In some second embodiments, the injectable solution of the second embodiments is made by combining the at least one water source, the crosslinkable polymer, and a competing agent solution comprising, consisting of, or consisting essentially of the competing agent and one or more competing agent solvents. In embodiments, the one or more competing agent solvents comprises, consists of, or consists essentially of a water source selected from produced water, tap water, ground water, surface water, seawater, wastewater, deionized water, distilled water, or any combination thereof.

In embodiments, the injectable solution of the second embodiments is made by combining the at least one water source, an aqueous solution of the crosslinkable polymer, and the competing agent solution.

In some second embodiments of the invention, the produced water comprises about 10 ppm to 500 ppm boron as dissolved reactive boron species. In such embodiments, the dissolved reactive boron species is at least one of one or more crosslinkers that crosslinks the crosslinkable polymer.

In embodiments, the crosslinkable polymer of the second embodiments is a cis-hydroxyl polymer. In some such embodiments, the crosslinkable polymer is guar.

Third Embodiments

In third embodiments, there is provided a method comprising combining a dialdehyde having 2 to 4 carbon atoms with a non-polymeric cis-hydroxyl compound in an aqueous solution to form a competing agent solution comprising a competing agent; adjusting the pH of the competing agent solution to maintain a pH of about 6.0 to about 6.5; combining a zirconium (IV) compound and an alkanolamine in one or more solvents to form a crosslinker composition comprising a zirconium complex; and maintaining the crosslinker composition at a temperature of between about 35° C. and 40° C. for 90 to 150 minutes. In embodiments, the crosslinker composition is allowed to cool to ambient temperature.

In embodiments, the method further comprises combining the crosslinker composition and the competing agent solution to form a delayed-crosslinking composition.

In embodiments, the combining the zirconium (IV) compound and the alkanolamine in one or more solvents comprises, consists of, or consists essentially of combining the alkanolamine with a solution of the zirconium (IV) compound in the one or more solvents. In embodiments, the combining in one or more solvents comprises, consists of, or consists essentially of combining the zirconium (IV) complex in a first solvent or first solvent mixture with the alkanolamine in a second solvent or solvent mixture, wherein the one or more solvents consists of or consists essentially of the first solvent or first solvent mixture and the second solvent or solvent mixture. In embodiments, the one or more solvents comprises, consists of, or consists essentially of one or more C1 to C7 alcohols. In embodiments, the one or more solvents comprises, consists of, or consists essentially of n-propanol. In embodiments, the combining is carried out at a temperature between 15° C. and 70° C., in embodiments between 15° C. and 60° C., in embodiments between 15° C. and 50° C., in embodiments between about 15° C. and about 46° C.; in such embodiments, the combining results in an exotherm that warms up the crosslinker composition. The temperature of the crosslinker composition is kept within the aforementioned prescribed limits by cooling the zirconium compound, the alkanolamine, the one or more solvents, the crosslinker composition, or any combination thereof. It can also be achieved by controlling the rate of the combining—the slower the rate, the lower the maximum temperature attained and the lower the temperature not exceeded. In embodiments, the combining in one or more solvents comprises, consists of, or consists essentially of combining the alkanolamine with the zirconium (IV) compound in the one or more solvents to form the crosslinker composition. In such embodiments, an exotherm results, causing the resulting mixture to warm up. In embodiments, the combining comprises, consists of, or consists essentially of adding the alkanolamine to a solution of the zirconium (IV) compound in the one or more solvents. In some such embodiments, the adding is effected at such a rate as to avoid the temperature of the crosslinker composition exceeding 70° C., in embodiments exceeding 60° C., in embodiments exceeding 50° C., in embodiments exceeding about 46° C. In embodiments the alkanolamine comprises, consists of, or consists essentially of triethanolamine. In embodiments, the zirconium (IV) compound is a zirconium tetraalkoxide. In embodiments, the zirconium (IV) compound is zirconium tetra(n-propoxide). In some such embodiments, the one or more solvents comprises, consists of, or consists essentially of n-propanol. In embodiments, the molar ratio of the zirconium (IV) compound to alkanolamine is between about 1:5 and about 1:11, in embodiments about 1:6 to 1:11, in embodiments about 1:7 to about 1:10, in embodiments about 1:8 to 1:10, in embodiments about 1:9. In some such embodiments, the alkanolamine comprises, consists of, or consists essentially of triethanolamine. In embodiments, after the combining of the zirconium (IV) compound and the alkanolamine in the one or more solvents and after an exotherm resulting from the combining, the method further comprises maintaining the crosslinker composition at a temperature of from about 35° C. to about 40° C. for about 60 minutes to about 200 minutes, in embodiments about 90 to about 150 minutes, in embodiments about 120 minutes.

In embodiments, the non-polymeric cis-hydroxyl compound comprises, consists of, or consists essentially of a sugar alcohol having 3 to 7 carbon atoms selected from erythritol, threitol, pentaerythritol, arabitol, xylitol, ribitol, mannitol, sorbitol, galactitol, fucitol, iditol, inositol, volemitol, glycerol, or a combination thereof. In embodiments, the non-polymeric cis-hydroxyl compound is sorbitol. In embodiments the dialdehyde is selected from glyoxal, maleic dialdehyde, fumaric dialdehyde, glutaric dialdehyde, and the reaction product of glucose with $NaIO_4$. In embodiments, the dialdehyde is glyoxal. In embodiments, the competing agent is the reaction product of the dialdehyde and the non-polymeric cis-hydroxyl compound in a 3:1 to 1:3 molar ratio, in embodiments 2:1 to 1:2 molar ratio, in embodiments about a 1:1 molar ratio. The dialdehyde and the cis-hydroxyl compound are suitably combined in water in about a 3:1 to 1:3 molar ratio, or in about a 2:1 to 1:2 molar ratio, or in about a 1:1 molar ratio to form a combination in water. In embodiments, the combination in water is left mixing for 1-3 hours, in embodiments about 2 hours following the combining the dialdehyde and the non-polymeric cis-hydroxyl compound to form the competing agent. In embodiments, the combination in water is heated to about 60° C. to 100° C. for about 15 minutes to 6 hours to form the competing agent. In embodiments, the combining is carried out in water at a concentration that provides about 40 wt % to 80 wt % of the competing agent at the end of the reaction, for example about 50 wt % to 80 wt %, or about 60 wt % to 80 wt %, or about 40 wt % to 70 wt %, or about 40 wt % to 60 wt % of the competing agent. In some embodiments, the pH of the reaction solution is adjusted to about 6.0 to 6.5, in embodiments 6.0 to 6.1. In other embodiments, the pH is not adjusted. In some embodiments, the pH of the reaction solution decreases as the reaction progresses. In some embodiments, the pH of the reaction product when no pH adjustment is carried out is about 4 to 5.

In embodiments, the method comprises combining the competing agent solution, the crosslinker composition, a water source, and a crosslinkable polymer to form an injectable solution. The order of addition or additions may be varied with the proviso that the competing agent is present when the crosslinker composition or any composition comprising a crosslinker for the crosslinkable polymer is combined with the crosslinkable polymer.

In embodiments, the method comprises combining the competing agent solution and the crosslinker composition to form the delayed crosslinking composition, and combining the delayed-crosslinking composition with the water source and the dry polymer. In other embodiments, the crosslinkable polymer is dissolved in and/or slurried in a solvent to form a polymer solution, the competing agent solution and the crosslinker composition are combined to form a delayed-crosslinking composition, and the delayed-crosslinking composition and the polymer solution are combined with a water source to form an injectable solution. In some embodiments, the crosslinkable polymer is dissolved and/or slurried in a solvent comprising, consisting of, or consisting essentially of the water source to form a polymer solution. In embodiments, the water source comprises, consists of, or consists essentially of produced water, tap water, groundwater, surface water, seawater, wastewater, or any combinations thereof. In some such embodiments, the water excludes or substantially excludes one or more reactive species.

Advantageously, the combining the delayed-crosslinking composition with the water source and the crosslinkable polymer to form an injectable solution is effected at a location proximal to a supply or reservoir of the water source (herein, a "location proximal to the water source"). In embodiments the water source is produced water, and the location proximal to the water source is in the vicinity of an oil recovery site, an oil well, and/or a structure in communication with a subterranean reservoir. In some such embodiments, the crosslinker composition and the competing agent are conveyed from their respective manufacturing locations (which in some embodiments are the same, in other embodiments are different from each other) to the location proximal to the water source, and the method comprises combining the competing agent and the crosslinker composition to form the delayed-crosslinking composition in the location proximal to the water source and combining the delayed-crosslinking composition with the water source and a crosslinkable polymer to form an injectable solution. In other such embodiments, the method comprises combining the competing agent and the crosslinker composition to form the delayed-crosslinking composition, transporting the delayed-crosslinking composition to the location proximal to the water source, and combining the delayed-crosslinking composition with water source and a crosslinkable polymer to form an injectable solution.

In embodiments, the method of the third embodiments further comprises injecting the injectable solution into a subterranean reservoir; and recovering a hydrocarbon from the reservoir. In embodiments, the hydrocarbon comprises, consists of, or consists essentially of crude oil. In some embodiments, the combining the delayed-crosslinking composition with the water source and the crosslinkable polymer to form an injectable solution is effected batch-wise—that is the combining is completed before the injecting the injectable solution. In other embodiments, the combining the delayed-crosslinking composition with water source and a crosslinkable polymer to form an injectable solution is carried out continuously. In such embodiments, the crosslinkable polymer is first dissolved and/or dispersed in a solvent comprising, consisting of, or consisting essentially of water to form a polymer solution; and the polymer solution, a water source, and the delayed-crosslinking composition are combined in a continuous flow basis, either by combining a flow of the water source and the delayed-crosslinking composition to form a first mixture and then combining a flow of the polymer solution with a flow of the first mixture, or by combining a stream of the water source with a stream of the polymer solution to form a second mixture and then combining a flow of the delayed-crosslinking composition with a flow of the second mixture, or by combining a flow of the delayed-crosslinking composition, a flow of the polymer solution, and a flow of the water source. In some embodiments, the solvent comprises, consists of, or consists essentially of produced water. In some embodiments, the water source comprises, consists of, or consists essentially of produced water.

In embodiments, the method comprises injecting the injectable solution immediately after the combining of the delayed-crosslinking composition with the water source and the crosslinkable polymer. In embodiments, the method comprises injecting the injectable solution substantially immediately, in embodiments between 5 seconds and 30 seconds, in embodiments 5 seconds and 60 seconds, or in embodiments 5 seconds and 120 seconds after the combining the delayed-crosslinking composition with the crosslinkable polymer.

In embodiments, the method comprises combining the competing agent solution, the polymer, and the water source to form a reactive premix, applying the crosslinker composition to the reactive premix to form an injectable solution, injecting the injectable solution into a subterranean reservoir, and recovering a hydrocarbon from the reservoir. In embodiments, the hydrocarbon is crude oil. In embodiments, the applying the crosslinker composition to the reactive premix to form an injectable solution is effected substantially immediately before the injecting the injectable solution into a subterranean reservoir, in embodiments, between 5 seconds and 30 seconds, in embodiments 5 seconds and 60 seconds, in embodiments 5 seconds and 120 seconds before the injecting.

In third embodiments, the molar ratio of the competing agent to zirconium complex is from 1:2 to 1:7, in embodiments from 1:2 to 1:5, in embodiments from 1:3 to 2:9, in embodiments about 1:4, in embodiments 1:3.9.

In embodiments, 30 seconds to 300 seconds after the combining of the delayed-crosslinking composition with the water source and the crosslinkable polymer, the injectable solution reaches a peak viscosity as measured at 100 s$^{-1}$ of about 100 cP to about 10,000 cP at a temperature of between 20° C. and 80° C. In embodiments, 30 seconds to 300 seconds after the combining of the delayed-crosslinking composition with the water source and the crosslinkable polymer, the injectable solution reaches a peak viscosity as measured as at 100 s$^{-1}$ of about 1,000 cP to about 1,800 cP at a temperature of between 20° C. and 80° C., in embodiments 60 seconds to 240 seconds, in embodiments 60 seconds to 180 seconds, in embodiments 60 seconds to 150 seconds.

Crosslinking is initiated by combining the crosslinker composition with the crosslinkable polymer. As noted supra, the competing agent of the invention is advantageously present when the crosslinker composition is combined with the polymer so that the competing agent provides a delay to the crosslinking reaction that delays the increase of viscosity of the injectable solution, the delay allowing time for the injectable solution to be injected into a subterranean formation and sufficiently penetrate the formation before a large viscosity increase. Surprisingly, the competing agent provides a suitable delay in crosslinking followed by rheological stability at temperatures above about 150° C. (above 300° F.). Employing the methods of the present invention, the delay period is evidenced by a delay in the onset of viscosity increase of the injectable solution of about 30 seconds to 8 minutes, or about 30 seconds to 7 minutes, or about 30 seconds to 6 minutes, or about 45 seconds to 6 minutes, or about 1 minute to 6 minutes, or about 1 minute 30 seconds to 6 minutes, or about 2 minutes to 6 minutes, or about 2 minutes 30 seconds to 6 minutes, or about 3 minutes to 6 minutes, or about 30 seconds to 5 minutes 30 seconds, or about 30 seconds to 5 minutes, or about 30 seconds to 4 minutes 30 seconds, or about 30 seconds to 4 minutes, or about 30 seconds to 3 minutes 30 seconds, or about 30 seconds to 3 minutes, or about 1 minute to 4 minutes, or about 2 minutes to 4 minutes. Such a delay is sufficient to enable pumping the injectable solution through the injection equipment and associated pipes etc. at a low viscosity.

Viscosity of the injectable solution then increases downhole and/or within the subterranean reservoir, where permeability differences between different areas of the reservoir are advantageously addressed and wherein proppant is advantageously transported into the fractures formed in the rock by the injectable solution during application of hydraulic pressure thereto. Further, conditions within the subterranean reservoir often include temperatures over about 20° C., for example about 30° C. to 200° C. and often about 50° C. to 180° C., for example about 60° C. to 180° C. or about 65° C. to 170° C. For this reason, viscosity measurements in the laboratory are determined over a range of temperatures from about 20° C. to 200° C. in order to more accurately predict initial and peak viscosities of the injectable solutions of the invention in the field.

In embodiments, the peak viscosity of the injectable solution peaks at from about 1000 cP to about 1800 cP when measured at 100 $s^{-1}$ when subject to a temperature increasing from about 20° C. to about 120° C. over a period of about five minutes, as determined by one of skill upon forming an injectable solution. It is an advantage of the methods and compositions of the invention that use the injectable solutions provides substantially the same peak viscosity as would be achieved with the same injectable solution exclusive of the competing agent and injected into the same reservoir, but also to provide a suitable delay.

Fourth Embodiments

In fourth embodiments, there is provided a method of recovering a hydrocarbon from a subterranean reservoir, the method comprising injecting the injectable solution of any of the first embodiments into a subterranean reservoir, and recovering a hydrocarbon from the reservoir. In embodiments, the hydrocarbon is crude oil.

In embodiments, the temperature of the subterranean reservoir is from 15° C. to 200° C., in embodiments 30° C. to 180° C., in embodiments 40° C. to 180° C.

Further Discussion of the Embodiments

The competing agent of the first, second, third, or fourth embodiments is the reaction product of a dialdehyde and a non-polymeric cis-hydroxyl compound. Applicants have found that the competing agent advantageously provides a delay in the crosslinking of crosslinkable polymers such as polysaccharides by crosslinkers such as dissolved reactive boron species in produced water and/or zirconium complexes such as zirconium (IV) triethanolamine complexes. The competing agent can be used in injectable solutions for high temperature applications such as injectable solutions that are subject to temperatures of up to 200° C., for example injectable solutions that penetrate hot subterranean formations having a temperature of up to 200° C. The competing agent can also be used to delay crosslinking in injectable solutions made from produced waters including high-solids produced waters containing various reactive species capable of crosslinking the crosslinkable polymers, reactive species such as borates and multivalent cations.

In the first, second, third, and fourth embodiments, the competing agent is formed by combining a dialdehyde (such as glyoxal) and a non-polymeric cis-hydroxyl compound (such as sorbitol) to form a mixture excluding or substantially excluding a crosslinker. For example, if glyoxal or another dialdehyde is added to a crosslinker such as a zirconium (IV) triethanolamine complex or a boron crosslinker before reacting the glyoxal with the sorbitol, the dialdehyde such as glyoxal binds to the crosslinker and is less available for reaction with a subsequently added cis-hydroxyl compound such as sorbitol.

The competing agent of the first, second, third, or fourth embodiments is the reaction product of a dialdehyde and a non-polymeric cis-hydroxyl compound. In embodiments, the dialdehyde is a water soluble dialdehyde. In embodiments, the dialdehyde has 2 to 4 carbons total and 0 to 2 carbons between aldehyde moieties. In embodiments, the dialdehyde is selected from glyoxal, maleic dialdehyde, fumaric dialdehyde, glutaric dialdehyde, and the reaction product of glucose with $NaIO_4$. In embodiments, the dialdehyde is glyoxal. In embodiments, the competing agent is the reaction product of the dialdehyde and the non-polymeric cis-hydroxyl compound in a 3:1 to 1:3 molar ratio, in embodiments 2:1 to 1:2 molar ratio, in embodiments about a 1:1 molar ratio. In embodiments, the dialdehyde and the cis-hydroxyl compound are combined in water in about a 3:1 to 1:3 molar ratio, or in about a 2:1 to 1:2 molar ratio, or in about a 1:1 molar ratio to form a combination in water. In some such embodiments, the combination in water is left for 1-3 hours, in embodiments about 2 hours to form a competing agent solution. In embodiments, the combination in water is heated to about 60° C. to 100° C. for about 15 minutes to 6 hours to form a competing agent solution. In embodiments, the combining is carried out in water at a concentration that provides about 40 wt % to 80 wt % of the competing agent at the end of the reaction, for example about 50 wt % to 80 wt %, or about 60 wt % to 80 wt %, or about 40 wt % to 70 wt %, or about 40 wt % to 60 wt % of the competing agent. In some embodiments, the pH of the reaction solution is adjusted to about 6.0 to 6.5, in embodiments 6.0-6.1. In other embodiments, the pH is not adjusted. In some embodiments, the pH of the reaction solution decreases as the reaction progresses. In some embodiments, the pH of the reaction product when no pH adjustment is carried out is about 4 to 5.

In some embodiments, the competing agent solution is added along with a crosslinkable polymer to at least one water source to form a polymer solution comprising a competing agent. In other embodiments, the competing agent solution is added to a crosslinker composition to form a delayed-crosslinking composition. The delayed-crosslinking composition is combined with the polymer and the at least one water source or an aqueous solution of the polymer and the at least one water source to form an injectable solution. In still other embodiments, the competing agent solution is added directly to the aqueous solution of the polymer. The competing agent is added to the injectable solution at about 0.01 wt % to 1 wt %, or about 0.05 wt % to 1 wt %, or about 0.1 wt % to 1 wt %, or about 0.01 wt % to 0.9 wt %, or about 0.01 wt % to 0.8 wt %, or about 0.01 wt % to 0.7 wt %, or about 0.01 wt % to 0.6 wt %, or about 0.01 wt % to 0.5 wt %, or about 0.01 wt % to 0.4 wt %, or about 0.01 wt % to 0.3 wt %, or about 0.01 wt % to 0.2 wt %, or about 0.05 wt % to 0.5 wt %, or about 0.1 wt % to 0.5 wt % in the injectable solutions of the invention. Alternatively, the competing agent is added to the injectable solution in a concentration of about $1\times10^{-4}$ M (molar) to about $1\times10^{-6}$ M.

One of skill will appreciate that the amount of competing agent added to the polymer solution is suitably adjusted according to the amount of dissolved reactive species (if any) in the produced water targeted to form the injectable solutions of the invention and the amount of the one or more crosslinkers in the injectable solution.

In embodiments, the non-polymeric cis-hydroxyl compound of the first, second, third, or fourth embodiments is a water-soluble non-polymeric cis-hydroxyl compound. In embodiments, the non-polymeric cis-hydroxyl compound is a sugar alcohol. In embodiments, the non-polymeric cis-hydroxyl compound is selected from the group consisting of sugar alcohols having 3 to 7 carbons and at least one cis-hydroxyl moiety or cis-hydroxyl oligomers having a molecular weight of less than 10,000 g/mol. In embodiments, the non-polymeric cis-hydroxyl compound comprises, consists of, or consists essentially of a vinyl alcohol head-to-tail oligomer having a weight average molecular weight of about 500 g/mol to 5,000 g/mol. In embodiments, the sugar alcohol having 3 to 7 carbon atoms is selected from erythritol, threitol, pentaerythritol, arabitol, xylitol, ribitol, mannitol, sorbitol, galactitol, fucitol, iditol, inositol, volemitol, glycerol, or any combination thereof. In embodiments, the non-polymeric cis-hydroxyl compound is sorbitol. In embodiments, the non-polymeric cis-hydroxyl compound comprises, consists of, or consists essentially of glycerol.

The crosslinkable polymer of the first, second, third, or fourth embodiments has a weight average molecular weight of greater than about 10,000 g/mol and up to about 10,000,000 g/mol.

In some embodiments, the crosslinkable polymer of the first, second, third, or fourth embodiments is a polysaccharide having at least 50 mole % repeat units comprising one or more cis-hydroxyl moieties. A cis-hydroxyl moiety is a pair of hydroxyl groups situated in a configuration such as a 1,2 configuration, wherein the hydroxyls are configured to allow the coordination thereof with the central atom of a coordination complex or crosslinker such as a borate oxyanion. Such configurations include cis-1,2-hydroxy groups on rigid ring structures such as sugars and on unsaturated C=C bonds as well as compounds having freely rotating C—C bonds wherein both carbons bear hydroxyl moieties and wherein rotation of the C—C bond can produce hydroxyls in a substantially eclipsed configuration when viewed as a Newman projection. Collectively, such compounds are denoted cis-hydroxyl compounds.

In other embodiments, the crosslinkable polymer of the first, second, third, or fourth embodiments is a polysaccharide having less than 50 mole % repeat units comprising one or more cis-hydroxyl moieties.

In embodiments, the crosslinkable polymer has a weight average molecular weight of about 10,000 g/mol to 10,000,000 g/mol, or about 20,000 g/mol to 10,000,000 g/mol, or about 30,000 g/mol to 10,000,000 g/mol, or about 40,000 g/mol to 10,000,000 g/mol, or about 50,000 g/mol to 10,000,000 g/mol, or about 60,000 g/mol to 10,000,000 g/mol, or about 70,000 g/mol to 10,000,000 g/mol, or about 80,000 g/mol to 10,000,000 g/mol, or about 90,000 g/mol to 10,000,000 g/mol, or about 100,000 g/mol to 10,000,000 g/mol, or about 200,000 g/mol to 10,000,000 g/mol, or about 300,000 g/mol to 10,000,000 g/mol, or about 500,000 g/mol to 10,000,000 g/mol, or about 1,000,000 g/mol to 10,000,000 g/mol, or about 20,000 g/mol to 9,000,000 g/mol, or about 20,000 g/mol to 8,000,000 g/mol, or about 20,000 g/mol to 7,000,000 g/mol, or about 20,000 g/mol to 6,000,000 g/mol, or about 20,000 g/mol to 5,000,000 g/mol, or about 20,000 g/mol to 4,000,000 g/mol, or about 20,000 g/mol to 3,000,000 g/mol, or about 20,000 g/mol to 2,000,000 g/mol. In embodiments, the crosslinkable polymer comprises at least 10 mole % repeat units comprising one or more cis-hydroxyl moieties, for example 10 mole % to 100 mole %, or about 20 mole % to 100 mole %, or about 30 mole % to 100 mole %, or about 40 mole % to 100 mole %, or about 50 mole % to 100 mole %, or about 60 mole % to 100 mole %, or about 70 mole % to 100 mole %, or about 80 mole % to 100 mole %, or about 90 mole % to 100 mole %, or substantially 100 mole % repeat units comprising one or more cis-hydroxyl moieties.

In embodiments, the crosslinkable polymer of the first, second, third, or fourth embodiments comprises, consists of, or consists essentially of a polysaccharide. Herein, the term "polysaccharide" includes not only unfunctionalized polysaccharides such as guar gum, but also functionalized polysaccharides or derivatives of polysaccharides such as carboxymethylguar, hydroxyethylguar, carboxymethyl hydroxyethylguar, hydroxypropylguar (HPG), and carboxymethyl hydroxypropyl guar. In embodiments, the carboxylic groups of carboxymethyl hydroxypropyl guar participate in a crosslinking reaction with the one or more crosslinkers.

In embodiments, the crosslinkable polymer of any of the first, second, third, or fourth embodiments is selected from guar gum, carboxymethylguar, hydroxyethylguar, carboxymethyl hydroxyethylguar, hydroxypropylguar (HPG), and carboxymethyl hydroxypropyl guar. In embodiments, the crosslinkable polymer of the first, second, third, or fourth embodiments comprises, consists of, or consists essentially of a guar gum. In embodiments, the crosslinkable polymer of the first, second, third, or fourth embodiments comprises, consists of, or consists essentially of carboxymethyl hydroxypropyl guar. In some such embodiments, the crosslinkable polymer is the sodium salt of carboxymethyl hydroxypropyl guar.

In embodiments, the crosslinkable polymer comprises, consists of, or consists essentially of one or more galactomannan polymers having a weight average molecular weight of about 50,000 g/mol to 8,000,000 g/mol, or about 100,000 g/mol to 5,000,000 g/mol, or about 1,000,000 g/mol to 3,000,000 g/mol. Galactomannan polymer, as employed herein, refers to those naturally occurring polysaccharides derived from various endosperms of seeds. They are primarily composed of D-mannose and D-galactose units. Examples of some plants producing seeds containing galactomannan gums include tara, huizache, locust bean, palo verde, flame tree, guar bean plant, honey locust, lucerne, Kentucky coffeetree, Japanese pagoda tree, indigo, henna, rattlebox, clover, fenugreek, and soybean. In some embodiments, the polysaccharide is provided in a convenient dry, particulate form generally smaller than what is retained on a No. 20 mesh sieve (U.S. Standard Sieve Series) but larger than that which passes through a No. 200 mesh sieve.

In embodiments, the crosslinkable polymer comprises, consists of, or consists essentially of a guar gum and/or one or more guar derivatives selected from guar gum, locust bean gum, karaya gum, carboxymethylguar, hydroxyethylguar, carboxymethyl hydroxyethyl guar, hydroxypropylguar (HPG), carboxymethyl hydroxypropyl guar, or any combination thereof. Guar is a branched copolymer composed of a mannose backbone with galactose branches; the ratio of mannose to galactose in guar is dependent on and characteristic of the endosperm from which it is derived. The mole ratio of mannose to galactose in guar can range, for example, from 1:1 to more than 3:1. The crosslinkable polymer can comprise cis-1,2 hydroxyl groups and/or carboxymethyl and/or hydroxyalkyl groups that participate in reaction with the crosslinker.

The polysaccharide is generally provided in solid, powder form, or in a hydrocarbon such as diesel or kerosene. When added to a neutral or acidic aqueous solution such as a neutral or acidic water source, the polysaccharide hydrates to form an aqueous solution of the polymer. Hydration of the polysaccharides, e.g., guar or HPG, will only take place under neutral or acidic conditions, that is, at a pH of about 7 or less. Prior to forming the injectable solution, the aqueous solution of the polymer has a viscosity in some embodiments of about 100 cP or less when measured at a shear rate of about 100 s$^{-1}$, for example about 5 cP to 100 cP, or about 10 cP to 100 cP, or about 15 cP to 100 cP, or about 20 cP to 100 cP, or about 25 cP to 100 cP, or about 30 cP to 100 cP, or about 35 cP to 100 cP, or about 40 cP to 100 cP, or about 45 cP to 100 cP, or about 50 cP to 100 cP, or about 5 cP to 95 cP, or about 5 cP to 90 cP, or about 5 cP to 85 cP, or about 5 cP to 80 cP, or about 5 cP to 75 cP, or about 5 cP to 70 cP, or about 5 cP to 65 cP, or about 5 cP to 60 cP, or about 5 cP to 55 cP, or about 5 cP to 50 cP, or about 10 cP to 90 cP, or about 20 cP to 80 cP, or about 30 cP to 80 cP, or about 40 cP to 80 cP, or about 50 cP to 80 cP. One of skill will understand that the viscosity of the polymer solution is selected to meet the requirements of the particular reservoir and equipment employed to apply to the reservoir such polymer solutions and/or injectable solutions formed from them.

The hydration is carried out using standard admixing procedures familiar to one of skill. After the combining, in some embodiments a suitable period of time is provided for hydration and full dissolution of the crosslinkable polymer. A suitable period of hydration is dependent on temperature, pH, ionic content and total dissolved solids of the produced water and the polymer solution, in addition to concentration and molecular weight of the crosslinkable polymer in the polymer solution. The hydration period is sufficient to provide maximum viscosity of the combination, an indication of maximum hydrodynamic volume of the polymer. In some embodiments, hydration of the crosslinkable polymer is achieved in about 30 seconds to about 10 minutes, or about 1 minute to 10 minutes, or about 1 minute to 5 minutes, or about 1 minute to 3 minutes. In some embodiments, agitation of the polymer solution is continued throughout the hydration period.

In embodiments, the amount of crosslinkable polymer in the polymer solution is about 10 ppt (parts per thousand) to 200 ppt, or about 10 ppt to 180 ppt, or about 10 ppt to 160 ppt, or about 10 ppt to 140 ppt, or about 10 ppt to 120 ppt, or about 10 ppt to 100 ppt, or about 10 ppt to 80 ppt, or about 10 ppt to 60 ppt, or about 10 ppt to 50 ppt, or about 10 ppt to 40 ppt, or about 10 ppt to 30 ppt, or about 10 ppt to 20 ppt, or about 12 ppt to 100 ppt, or about 14 ppt to 100 ppt, or about 16 ppt to 100 ppt, or about 18 ppt to 100 ppt, or about 20 ppt to 100 ppt, or about 15 ppt to 50 ppt, or about 15 ppt to 30 ppt.

In embodiments, the injectable solution of the first, second, third, or fourth embodiments comprises one or more further additives selected from a proppant, biocide, demulsifier, clay stabilizer, surfactant, gel stabilizer, pH adjusting agent, scale inhibitor, or any combination thereof. Examples of suitable biocides include Nalco Champion products EC6297A, EC6116A, EC6111A, or EC9555A (available from Nalco Champion of Houston, Tex.), or a combination of two or more thereof. Biocides are added to the polymer solution or the injectable solution to provide a total concentration of about 200 ppm to 2000 ppm. Examples of suitable surfactants include ST/IFT management agents such as Nalco Champion product FFS100E, wettability agents such as Nalco Champion products 6191X or FFS100E, or non-emulsifying agents such as Nalco Champion products ASP301 or FNE200, and combinations thereof. Surfactants are added to the polymer solution or the injectable solution to provide a total concentration of about 250 ppm to 2000 ppm. Examples of suitable scale inhibitors include phosphonates, phosphate esters polymeric organic acids, or a combination thereof. Scale inhibitors are added to the polymer solution or the injectable solution to provide a total residual concentration of above 10 ppm in the produced water flowing back from the reservoir for about 6 to 18 months. Examples of suitable clay stabilizers include potassium chloride, tetramethyl ammonium chloride, choline chloride, Nalco Champion products ASP425, Clay Safe SA or Product 239, or combinations thereof. Clay stabilizers are added to the polymer solution or the injectable solution to provide a total concentration of about 100 ppm to 2 wt %.

Useful pH control agents include bases. Suitable bases for use in the methods of the invention are not particularly limited and include any chemical species or molecular entity that is soluble in water and has an available pair of electrons capable of forming a covalent bond with a proton (Brønsted base) or with the vacant orbital of some other species (Lewis base). In embodiments the base is selected from an alkali metal hydroxide, an alkali metal carbonate, or a mixture thereof. Other possible pH control agents are $Ca(OH)_2$, $Mg(OH)_2$, $Bi(OH)_3$, $Co(OH)_2$, $Pb(OH)_2$, $Ni(OH)_2$, $Ba(OH)_2$ and $Sr(OH)_2$. At temperatures above about 175° F. (79° C.), potassium fluoride is used to prevent the precipitation of MgO when $Mg(OH)_2$ is used as a base.

In some embodiments, a buffering agent is employed to buffer the injectable solution, such that moderate amounts of either a strong base or acid added to the system—such as inadvertent additions for example—do not cause any large change in pH value of the injectable solution. The buffering agent may be a combination of a weak acid and a salt of the weak acid; an acid salt with a normal salt; or two acid salts. Examples of suitable buffering agents which may be employed to provide an injectable solution having the desired pH value are $NaH_2PO_4$—$Na_2HPO_4$; sodium carbonate-sodium bicarbonate; and sodium bicarbonate, or other like agents. By employing a buffering agent instead of a simple base, an injectable solution is provided which is more stable to a variance of pH values found in local water supplies, to the influence of acidic materials located in formations, and the like.

In embodiments, the injectable solutions of the first, second, third, or fourth embodiments comprises one or more proppants. A proppant employed in hydraulic fracturing is a solid particulate material, typically sand, treated sand, or a man-made ceramic material. The proppant is of a size, shape, and hardness suitable for keeping an induced hydraulic fracture open during or following a hydraulic fracturing process. The proppant is added to the injectable solution in an amount that differs depending on the type of fracturing process employed and the point in the process where the proppant is injected. More viscous injectable solutions are capable of delivering higher amounts of proppant. The amount of proppant is not particularly limited and is variable depending on the injection solution composition as well as the intended use. In embodiments, the injectable solution further comprises one or more additional components selected from a gel breaker, a demulsifier, a clay stabilizer, a biocide, a scale inhibitor, one or more surfactants, a pH adjuster, or a mixture of two or more thereof.

In embodiments, the injectable solutions of the first, second, third, or fourth embodiments comprise a gel breaker. The gel breaker is optionally employed to predictably degrade the set gel, i.e., the crosslinked polysaccharide, after a predetermined period of time. The gel breakers are generally either enzymes or oxidizing agents. The specific gel breaker employed will depend on the temperature to which the set gel is subjected. Suitable gel breakers include $KBrO_3$ and similar materials, e.g., $KClO_3$, $KIO_3$, peroxides, perborates, persulfates, permanganates (for example, ammonium persulfate, sodium persulfate, and potassium persulfate), sodium bromate, and the like, are used to break the boron-mediated crosslink structure. Suitable enzymes include those that catalyze the hydrolysis of the glycosidic bonds between the monomer units of the polysaccharide. The selection of a suitable enzyme for a particular crosslinkable polymer such as guar or HPG can be determined from references well known to those of skill. The amount of enzyme employed in any particular gel solution as defined herein will depend on the amount of crosslinkable polymer present, and also upon the temperature and pH to which the crosslinked crosslinkable polymer is to be subjected. It is noted, however, that produced water that starts flowing back from the reservoir once hydraulic pressure is released usually has a pH ranging from 6 to 8 which helps break the crosslink junctions, thus aiding in injectable solution recovery.

Produced Water

In embodiments, any of the water sources of the first, second, third, and fourth embodiments comprises, consists of, or consists essentially of produced water. In some first, second, third, or fourth embodiments, the water sources usefully addressed by the methods of the present invention include those sources having at least 10 ppm elemental boron. Concentrations of boron in surface water range widely; however, average boron concentrations in surface water sources are typically well below 0.6 ppm in most regions of the world. In sharp contrast, produced water often includes 10 ppm or more of elemental boron. As will be appreciated, water sources containing dissolved reactive species such as produced waters containing dissolved reactive boron are particularly important for the second embodiments, wherein the crosslinker is solely provided by the water source.

In embodiments, the water sources include about 10 ppm to 500 ppm elemental boron present in the water source as dissolved reactive boron species, or about 12 ppm to 500 ppm, or about 14 ppm to 500 ppm, or about 16 ppm to 500 ppm, or about 18 ppm to 500 ppm, or about 20 ppm to 500 ppm, or about 25 ppm to 500 ppm, or about 30 ppm to 500 ppm, or about 35 ppm to 500 ppm, or about 40 ppm to 500 ppm, or about 45 ppm to 500 ppm, or about 50 ppm to 500 ppm, or about 55 ppm to 500 ppm, or about 60 ppm to 500 ppm, or about 65 ppm to 500 ppm, or about 70 ppm to 500 ppm, or about 75 ppm to 500 ppm, or about 80 ppm to 500 ppm, or about 85 ppm to 500 ppm, or about 90 ppm to 500 ppm, or about 95 ppm to 500 ppm, or about 100 ppm to 500 ppm, or about 110 ppm to 500 ppm, or about 120 ppm to 500 ppm, or about 130 ppm to 500 ppm, or about 140 ppm to 500 ppm, or about 150 ppm to 500 ppm, or about 175 ppm to 500 ppm, or about 200 ppm to 500 ppm, or about 250 ppm to 500 ppm, or about 300 ppm to 500 ppm, or about 350 ppm to 500 ppm, or about 400 ppm to 500 ppm, or about 450 ppm to 500 ppm, or about 10 ppm to 400 ppm, or about 10 ppm to 350 ppm, or about 10 ppm to 300 ppm, or about 10 ppm to 250 ppm, or about 10 ppm to 200 ppm, or about 10 ppm to 150 ppm, or about 10 ppm to 140 ppm, or about 10 ppm to 130 ppm, or about 10 ppm to 120 ppm, or about 10 ppm to 110 ppm, or about 10 ppm to 100 ppm, or about 20 ppm to 300 ppm, or about 20 ppm to 200 ppm, or about 20 ppm to 150 ppm, or about 20 ppm to 120 ppm elemental boron, present as dissolved reactive boron species.

Produced water often has a total dissolved solids content at least about 1 wt %, and up to about 35 wt %. The dissolved solids include various ions. Table 1 shows representative analyses of some cations as well as chloride anion present in a sample of produced water obtained from the Permian Basin region of the United States, as measured by inductively coupled plasma (ICP) analysis or titration in the case of chloride anion. While these measurements are not a total analysis, one of skill will appreciate that in addition to dissolved boron species, large concentrations of ions, such as sodium, calcium, magnesium, and other divalent cations cause solution instability when injectable solutions are formed using produced water. Instability is evidenced by formation of gel particles, coagulum, polymer coated out on contact surfaces, and the like. The products of this instability cause plugged equipment in the field, reduced reservoir permeability, plugged formation, and ultimately failure to accomplish mobility control within the reservoir. Further, some ions present in the produced water, such as iron, are also capable of ionic or coordination reactions with crosslinkable polymers such as guar gum, 2-carboxymethyl hydroxypropyl guar, and cis-hydroxylated compounds. The presence of such ions further complicates attempts to use produced water to provide delayed crosslinking of the crosslinkable polymer. It is a feature of the invention that the injectable solutions formed according to the invention do not suffer from instability in the presence of the various ions, including those that can react with cis-hydroxylated compounds. It is a feature of the invention that when the competing agent is included in an injectable solution formed using produced water, observable crosslinking of crosslinkable polymers, manifested as an increase in viscosity, is delayed for at least 30 seconds and as long as 5 minutes.

TABLE 1

ICP analysis of some elements measured in produced water obtained from the Permian Basin region. *Cl was determined titrimetrically.

| Element | Concentration, mg/L |
| --- | --- |
| Ba | 1.9 |
| B | 39 |
| Ca | 1900 |
| Fe | 83 |
| Mg | 270 |
| K | 510 |
| Na | 40,000 |
| Sr | 440 |
| Cl* | 68,000 |
| Si | 11 |

In some second embodiments of the invention, the pH of the water source employed in forming the polymer solution is or is adjusted to be about 5 to 8, or about 5.1 to 8, or about 5.2 to 8, or about 5.3 to 8, or about 5.4 to 8, or about 5.5 to 8, or about 5.6 to 8, or about 5.7 to 8, or about 5.8 to 8, or about 5.9 to 8, or about 6.0 to 8, or about 6.1 to 8, or about 6.2 to 8, or about 6.3 to 8, or about 6.4 to 8, or about 6.5 to 8, or about 5 to 7.9, or about 5 to 7.8, or about 5 to 7.6, or about 5 to 7.4, or about 5 to 7.2, or about 5 to 7.0, or about 5 to 6.9, or about 5 to 6.8, or about 5 to 6.7, or about 5 to 6.6, or about 5 to 6.5, or about 5 to 6.4, or about 5 to 6.3, or about 5 to 6.2, or about 5 to 6.1, or about 5 to 6.0, or about 5 to 5.9, or about 5 to 5.8, or about 5 to 5.7, or about 5 to 5.6, or about 5 to 5.5, or about 5 to 5.4, or about 5 to 5.3, or about 5.5 to 7, or about 5.5 to 6.5. In some such second embodiments, the water source employed to form the polymer solution has a pH within the suitable range, and no adjustment of pH is carried out prior to forming a polymer solution from the water source. In other second embodiments, the pH is lower than 5 or higher than 8 and adjustment is necessary to provide pH in a suitable range for polymer solution formation. In some second embodiments, a water source having a pH of less than 5 is acceptable to use in forming the polymer solution, since the low pH prevents substantial crosslinking by the dissolved reactive boron species. However, in other second embodiments use of water source having a pH of less than about 5 is impractical due to the amount of pH adjustment agent required in order to increase the pH to 8.5 or greater during formation of the injectable solution, lowered solubility of the crosslinkable polymer, or both. Thus in the second embodiments, where pH of the water source is less than about 5, it is a selection of the user to adjust the pH to 5 or greater or simply use the water source without adjusting the pH prior to forming the polymer solution.

Agents employed to adjust the pH of the water source to about 5 from below about 5 are bases. Suitable bases for use in the methods of the invention are not particularly limited and include any chemical species or molecular entity that is soluble in water and has an available pair of electrons capable of forming a covalent bond with a proton (Brønsted base) or with the vacant orbital of some other species (Lewis base). Commonly employed bases include sodium, potassium, or calcium hydroxide. Agents employed to adjust the pH of the water source to about 6.5 or less starting from a pH above about 6.5 are acids. Suitable acids for use in the methods of the invention are not particularly limited and include any chemical species or molecular entity that is soluble in water and capable of donating a proton (Brønsted acid) or capable of forming a covalent bond with an electron pair (Lewis acid). Commonly employed acids include sulfonic acid, phosphoric acid, hydrochloric acid, organic acids such as citric acid or acetic acid, sulfamic acid, and nitric acid. The amount of acid or base is not limited and are added in a suitable amount to reach the target pH, as will be understood by those of skill.

EXAMPLES

Example 1: Aqueous Competing Agents

A round-bottom flask was charged with a 40% by weight solution of glyoxal in water (amounts given in Table 2), and mixing was started. To the glyoxal solution in the flask was added a 70% by weight solution of sorbitol in water (amounts given in Table 2), and the contents of the flask were mixed until homogenous. The pH of the solution in the flask was monitored. To the contents of the flask was added aqueous sodium hydroxide (50% by weight solution in water) to raise the pH of the liquid to between 6.0 and 6.1. The solution was stirred for a further two hours at room temperature.

TABLE 2

| Competing Agent Solution | Amount of 40% glyoxal/gram | Amount of 70% sorbitol/gram | Amount of 50% sodium hydroxide/gram | Approximate mole ratio of glyoxal:sorbitol |
|---|---|---|---|---|
| A | 131.99 | 246.62 | 0.50 | 1:1 |
| B | 290.20 | 260.24 | 1.00 | 2:1 |
| C | 145.10 | 520.49 | 2.18 | 1:2 |

Example 2: Crosslinker Solution

A 500 ml round-bottom flask was charged with 117 grams of a 70% by weight solution of zirconium tetra(n-propoxide) in n-propanol, and mixing was started. The temperature of the contents of the flask was continuously monitored. To the zirconium tetra(n-propoxide) solution was added dropwise triethanolamine to control the exotherm. The triethanolamine was added over approximately 35 minutes and the maximum temperature attained was about 46° C. (115° F.). The contents of the flask were stirred for a further approximately 85 minutes giving a total reaction time of about 120 minutes. During this 85 minute-period, the contents were allowed to cool to about 38° C. (100° F.) and were maintained at this temperature for the remainder of the 85 minute period by heating. The contents were then cooled to room temperature to yield the crosslinker solution.

Example 3: Delayed-Crosslinking Compositions

Each competing agent solution (2 mL) from EXAMPLE 1 was individually mixed with a portion of the crosslinker solution from EXAMPLE 2 to give an delayed-crosslinking composition, as shown in Table 3:

TABLE 3

| Delayed-crosslinking composition solution | Competing agent solution | Crosslinker solution |
|---|---|---|
| D | 2 mL of competing agent solution A | 35 mL of crosslinker solution |
| E | 2 mL of competing agent solution B | 35 mL of crosslinker solution |
| F | 2 mL of competing agent solution C | 35 mL of crosslinker solution |

Example 4: Injectable Solutions' Viscosity Measurements

Each of six injectable solutions was made up by mixing water, 45 pounds per thousand gallons of carboxymethyl hydroxypropyl guar, one gallon per thousand gallons of a demulsifier, one gallon per thousand gallons of a clay stabilizer choline chloride), half a gallon per thousand gallons of a biocide, half a gallon per thousand gallons of a scale inhibitor, half a gallon per thousand gallons of a nonionic surfactant, eight gallons per thousand gallons of a gel stabilizer, three gallons per thousand gallons of aqueous sodium hydroxide (20% by weight solution of sodium hydroxide in water), and either 1.1 or 1.2 gallons per thousand gallons of delayed-crosslinking compositions D, E, or F (from Example 3), as shown in Table 4:

TABLE 4

| Injectable Solution | Water Used | Delayed-crosslinking composition | Gallons of delayed-crosslinking composition added/ thousand gallons |
|---|---|---|---|
| G | Tap water, Fresno, TX | D | 1.1 |
| H | Tap water, Fresno, TX | D | 1.2 |
| I | Tap water, Fresno, TX | D | 1.2 |
| J | Tap water, Fresno, TX | D | 1.1 |
| K | Tap water, Fresno, TX | E | 1.1 |
| L | Tap water, Fresno, TX | F | 1.1 |

Each of the six injectable solutions was heated to 163° C. (325° F.) at a pressure of 400 psi and the viscosity measured at 100 s$^{-1}$ using a Chandler Engineering Model 5550 Rheometer available from Chandler Engineering, Tulsa, Okla. over a period of approximately two hours thirty minutes.

Figure 1:
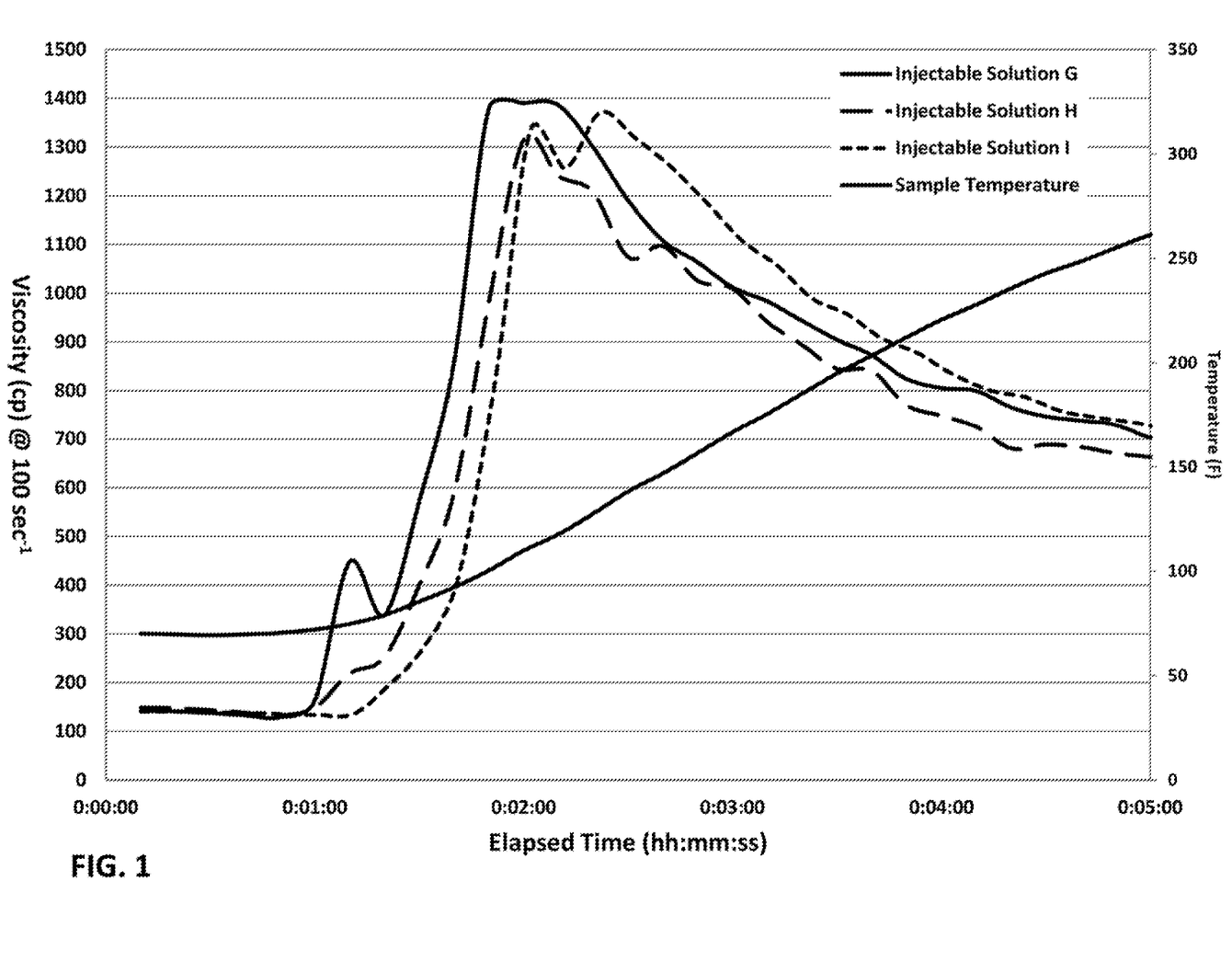
FIG. 1 shows a plot of viscosity as a function of time for three injectable solutions with the same competing agent solutions.
Figure 2:
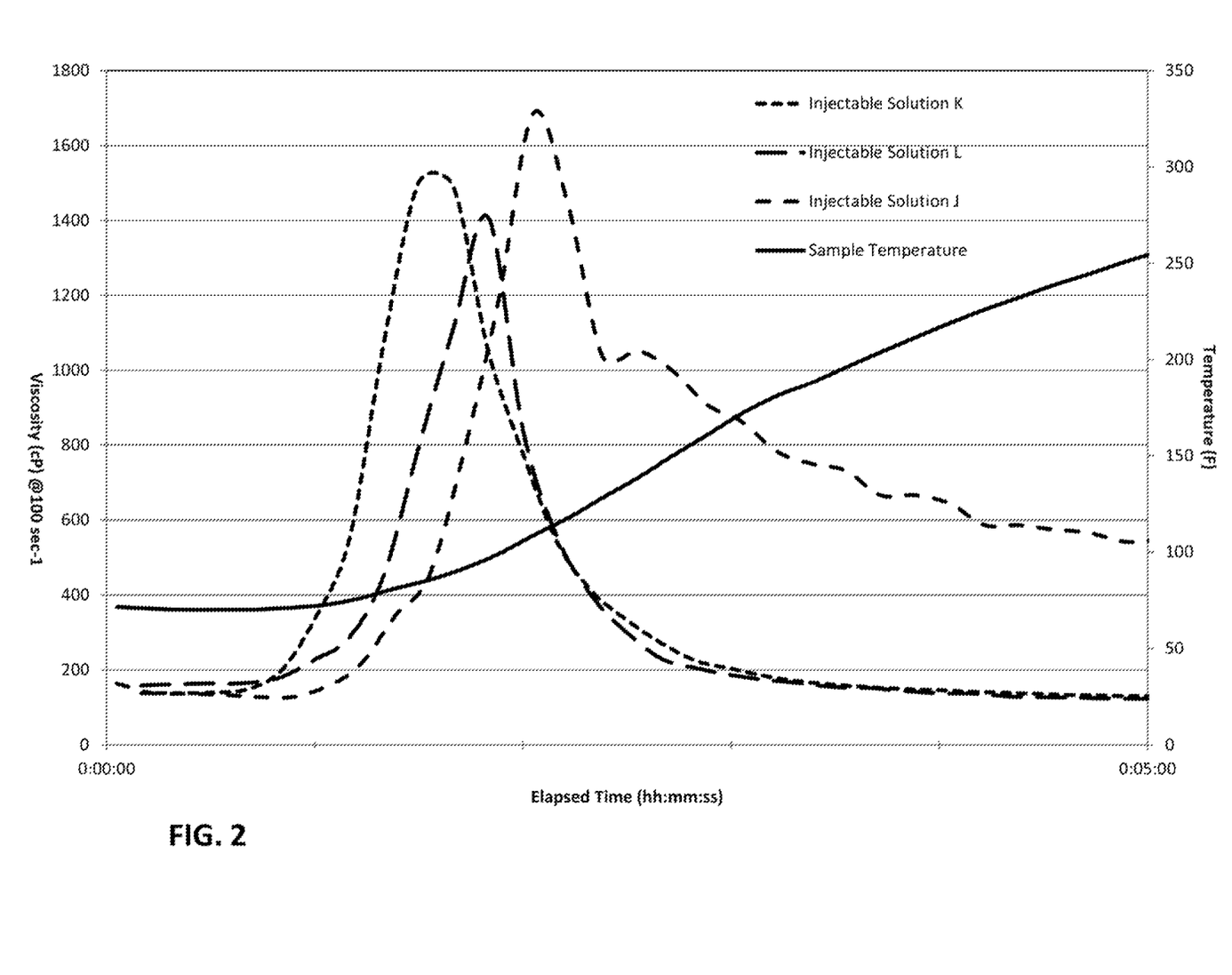
FIG. 2 shows a plot of viscosity as a function of time for three injectable solutions having three different competing agent solutions.

Plots of the viscosity of injectable solutions G, H, and I are shown in FIG. 1; and plots of the viscosity of injectable solutions J, K, and L are shown in FIG. 2.

As exhibited by the plots of FIGS. 1-2, the viscosity of the injectable solutions advantageously increased after a delay to a maximum (peak) of between 1200 and 1800 cP (at 100 sec$^{-1}$), then decreased. After the initial viscosity increase and peak, injectable solutions G, H, I, J, K, and L each maintained a viscosity in excess of 80 cP for at least 120 minutes at about 162.5° C. (about 325° F.).

The invention illustratively disclosed herein can be suitably practiced in the absence of any element which is not specifically disclosed herein. Additionally each and every embodiment of the invention, as described herein, is intended to be used either alone or in combination with any other embodiment described herein as well as modifications, equivalents, and alternatives thereof. In various embodiments, the invention suitably comprises, consists essentially of, or consists of the elements described herein and claimed according to the claims. It will be recognized that various modifications and changes may be made without following the example embodiments and applications illustrated and described herein, and without departing from the scope of the claims.

What is claimed is:

1. A delayed-crosslinking composition made by the steps consisting essentially of:
    (a) combining in water and reacting in a 1:1 molar ratio glyoxal with a C3 to C7 sugar alcohol selected from erythritol, threitol, pentaerythritol, arabitol, xylitol, ribitol, mannitol, sorbitol, galactitol, fucitol, iditol, inositol, volemitol, glycerol, and any combination thereof to form a competing agent solution;
    (b) optionally adjusting the pH of the combination of the dialdehyde and the non-polymeric cis-hydroxyl compound to about 6.0 to about 6.5;
    (c) combining an alkanolamine with a zirconium (IV) compound in the presence of a C1 to C7 alcohol to form a crosslinker composition; and
    (d) combining the competing agent solution and the crosslinker composition to form the delayed-crosslinking composition.

2. The delayed crosslinking composition of claim 1, wherein the molar ratio of the zirconium (IV) compound to the alkanolamine is between 1:5 and 1:10.

3. The delayed crosslinking composition of claim 1, wherein the alkanolamine is triethanolamine.

4. The injectable solution of claim 1, wherein the zirconium (IV) compound is zirconium tetra(n-propoxide).

5. The delayed crosslinking composition of claim 1, wherein the C3 to C7 sugar alcohol is sorbitol.

6. The delayed crosslinking composition of claim 1, wherein the crosslinker composition is maintained at a temperature from about 35° C. to about 40° C. for 90 to 150 minutes before the combining the competing agent solution and the crosslinker composition.

7. The delayed crosslinking composition of claim 1, wherein the C1-C7 alcohol is n-propanol.

8. An injectable composition comprising:
    the delayed-crosslinking composition of claim 1;
    a polysaccharide;
    a proppant; and
    a water source selected from the group consisting of produced water, tap water, groundwater, surface water, seawater, wastewater, and any combination thereof.

9. The delayed crosslinking composition of claim 1, wherein an aqueous solution of the C3-C7 sugar alcohol is combined with the glyoxal.

10. A delayed crosslinking composition consisting essentially of:
    a competing agent solution consisting essentially of water and a reaction product of a 1:1 molar ratio of glyoxal with a C3 to C7 sugar alcohol selected from erythritol, threitol, pentaerythritol, arabitol, xylitol, ribitol, mannitol, sorbitol, galactitol, fucitol, iditol, inositol, volemitol, glycerol, and any combination thereof; and
    a crosslinker composition consisting essentially of a solvent and a reaction product of an alkanolamine with a zirconium (IV) compound.

11. The delayed crosslinking composition of claim 10, wherein the C3 to C7 sugar alcohol is sorbitol, the zirconium (IV) compound is zirconium tetra(n-propoxide), the solvent is a C1-C7 alcohol, and the alkanolamine is triethanolamine.

12. An injectable composition comprising:
    the delayed-crosslinking composition of claim 10;
    a polysaccharide;
    a proppant; and
    a water source selected from the group consisting of produced water, tap water, groundwater, surface water, seawater, wastewater, and any combination thereof.

* * * * *